April 26, 1966    C. H. LATIMER-NEEDHAM ETAL    3,247,921
AIR CUSHION LOAD PALLETS
Filed Feb. 21, 1963

INVENTORS
CECIL H. LATIMER-NEEDHAM
RICHARD S. JONES

BY *Larson and Taylor*
ATTORNEYS

United States Patent Office 3,247,921
Patented Apr. 26, 1966

3,247,921
AIR CUSHION LOAD PALLETS
Cecil Hugh Latimer-Needham, Wonersh, near Guildford, and Richard Stanton Jones, Cowes, Isle of Wight, England, assignors to Westland Aircraft Limited, Yeovil, England
Filed Feb. 21, 1963, Ser. No. 260,961
1 Claim. (Cl. 180—7)

This invention relates to devices for lifting and moving vehicles, loads, or other objects which have no wheels or which have for some reason lost the use of their wheels. The invention further relates to such devices which use an air cushion for the rolling medium in place of wheels or rollers and more particularly to devices which have become known as lift pads or pallets.

Pneumatic transport devices in the form of pads, known to those familiar with the art as "levapads," which operate on a thin film of air over a smooth surface, are already in use for the purpose of moving baggage in the holds of aircraft, workpieces on benches, or even heavy machinery over a workshop floor. However, such devices are unsuitable in many applications because of the low clearance heights involved and the surface limitations, which surfaces must necessarily be smooth because of the small clearances.

It is with the above problems in mind that the present invention has been evolved which is designed more especially for moving large heavy objects over unprepared surfaces.

One object of the present invention is to provide an air pallet which could, for example, be maneuvered beneath the wings and/or fuselage of a crashed aircraft and supplied with gas or air under pressure in a manner as to raise the aircraft for the purpose of towing over soft terrain without danger of becoming bogged down and with minimum traction force.

Another object of the invention is to provide such pallets which may be towed to the site behind a tractor incorporating a blower or compressor unit and after positioning beneath the object to be moved can be supported with air or gas for the purpose of lifting the load, the tractor also supplying the towing force from the same power source or an auxilary power source.

Another object of the invention is to embody a jacking means in the pallet in the form of inflatable bags for the purpose of adjusting the load before raising it upon the air cushion.

Yet a further object of the invention is to provide a pallet or pallets which are stable even on a relatively high cushion.

Still another object is to provide a pallet which can be operated by using the supply of compressed air generally available through existing flexible airlines found in factories and warehouses.

Still another general object is to provide a pallet or the like which is wholly or partially flexible and inflatable, whereby the device can be placed in narrow spaces under loads and inflated to lift the load and support it by a pressurized supporting cushion which is maintained under the device.

Further objects and advantages of the invention will become readily apparent from the following detailed description with reference to the accompanying drawings in which.

Figure 1:
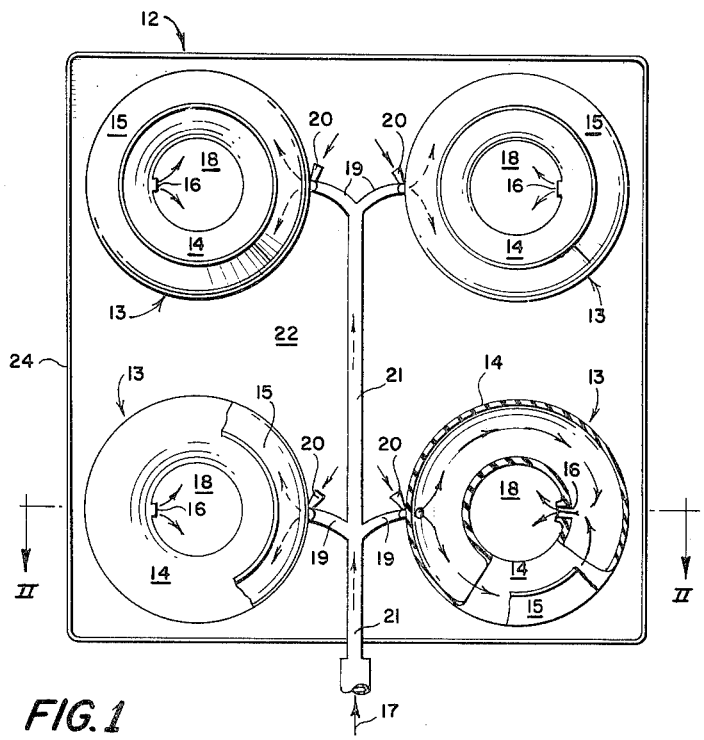
FIGURE 1 shows an inverted plan view of a pallet embodying an exemplary form of the invention in which the pallet is supported by a number of spaced air cushion pads for increased stability.

Pallet construction according to the invention will now be described with reference to FIGURES 1 and 2 of the drawings wherein the plenum chamber concept is applied to pallets for the removal of taller loads such as packing cases where stability is all important during removal.

Accordingly, a composite pallet generally indicated at 12 of any convenient shape and having a platform 22 of metal or similar material, is provided with a number of discreet and spaced pressurized air cushion areas in the form of pads 13 each having its own pressure air supply. Each pad can itself form a pallet and may be towed by a tractor as hereinbefore described. In a preferred construction each spaced cushion "pad" 13 is formed from an inflatable circular tube 14 similar to the inner tube of a tire and is provided with a flexible depending lip or skirt 15. In conditions in which the mass flow of air from the pressure source is not so great as could be desired, leaks such as might be caused by crinkles in a simple skirting arrangement when collapsed under the pallet can be avoided by this construction. Each inflatable tube 14 is provided with a hole or holes 16 of predetermined size in the inner wall of the inflatable tube 14 through which air from the pressure source 17 will flow into the pads 13 to generate the air cushion within the plenum chamber 18 created by the tubes 14 after they have been inflated. Once the load is raised onto its air cushion the skirt 15 will unfold and retard the escape of air from beneath the pads 13 whilst increasing the clearance height of the pallet 12. If desired, where a peripheral skirting is utilized in addition to the discreet inflatable tubes 14, this may also be inflatable by the pressure air.

Figure 2:
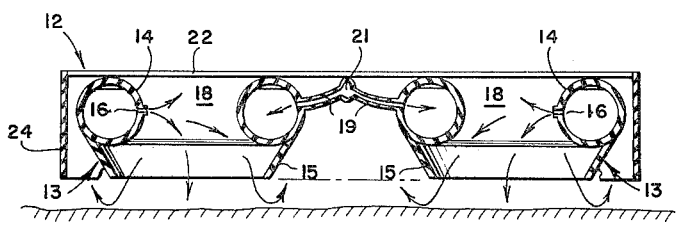
FIGURE 2 is a sectional view of the pallet shown in FIGURE 1 substantially on the line II—II of FIGURE 1.

It will be seen from FIGURES 1 and 2 that the cushion pads 13 are symmetrically disposed about the underside of the pallet 12 for reasons of stability, and are fed from pipes 19 which are flexible so that the pads 13 could be quickly repositioned according to load requirements. The inflatable tubes 14 make their own airtight seal with the pallets 12 and would normally be held in position by friction contact. However, the tubes 14 may be fixed to the pallet 12 if it is more convenient to do so.

In addition to the discreet flexible skirt 15 the pallet 12 can also be provided with a flexible peripheral base skirting 24 to retard the escape of the overall air cushion pressure air. With this arrangement, the air escaping under the discreet cushion skirting 15 builds up a secondary air cushion around and between the discreet air cushions 13 but at a lower pressure, which would however be greater than ambient and thus assist in supporting the load.

Air pallets of this kind would find particular applications in workshops and factories where air line compressed air is generally available at a pressure of about 100 lbs. per square inch, and since the cushion pressure required to lift the loads concerned will be of the order of 3 lbs. per square inch this pressure could be utilized providing the mass flow of air can be increased. This is achieved by delivering the air to the pallet 12 through an injector 20 so that ambient air is entrained to provide the requisite mass flow. An injector 20 may be associated with each discreet cushion area 13, injector 20 being fed by a branch 19 from flexible or rigid manifold 21 having an inlet connected to the pressure air supply 17. Alternatively, where pressure air lines are not available the pallets 12 may be fed by flexible pipes from a compressor, which could be a mobile unit such as a tractor/blower unit hereinbefore described.

In operation of the invention, in one example as applied to an aircraft which has made a crash landing on the end of a runway where it is an immediate danger to other aircraft or necessitates putting the runway out of use, quick removal is a necessity. In the past inflatable lift bags would have been used to raise the wings sufficiently for jacks or wheeled trolleys to be placed in position beneath the aircraft before towing away. This was often a lengthy and difficult procedure and would be impossible if the ground was soft or marshy. With the present invention, however, a number of shallow palets can be towed to the site behind a tractor/blower unit and the pallets manoeuvred to any accessibe points beneath the wings, fuselage, and tail unit of the aircraft where it is possible to obtain a lift. In case the aircraft should be so "pancaked" that the pallets will not pass beneath it at the required number of points, then extensible beams can be used to pass under or through the aircraft and the pallets attached to the end of the beams clear of the aircraft, but forming pontoons for the "bridge" or "cradle" on which the aircraft will be lifted. However, let it be assumed that sufficient pallets can be placed beneath the aircraft for a "lift" and that the load has been adjusted onto an even keel. The pallets can now be connected together by extensible beams to positively locate them if necessary and the trunk connections made from the blower unit and between the pallets as required.

Air or gas from a blower or gas turbine mounted on a tractor unit can now be supplied to the pallet ducting, and if the cushion pressure and total cushion area available have been correctly calculated for the weight of the aircraft, a "lift" will be obtained. Aircraft can now be towed away. Obviously, the rougher the ground which has to be traversed the greater the clearance required and flexible skirts will be essential in this role. Once the aircraft is cushionborne, a small traction force provided by the wheels or caterpillar tracks of the tractor/blower unit is all that is required to move a heavy aircraft. In most cases the tractor/blower unit supported on large pneumatic wheels or caterpillar tracks will be found most practicable but over boggy ground a tractor unit which is also a ground effect vehicle or semi ground effect vehicle may be necessary.

In operation, the invention could for example be utilized for moving a large crate over a workshop floor. The stabilised pallets 12 with the discreet air cushion pads 13 attached but deflated may be pushed under the crate runners, or the reinforcing straps or the crate may be jacked up, and the pad assemblies 13 with the platform may be positioned beneath the load. The platform 22 is then positioned over the deflated pads 13 and the pressure source 17 is connected to the pressure air line or compressor. The platform 22 need not be rigid since it is supported on the one side by the base of the crate and on the other side by the generated air cushion system. Once the air supply is connected and the air cushions are created simultaneously the pads 13 will act as a series of spaced air cushion "legs" and tilting of the pallet 12 and the load carried is resisted and causes a greater pressure-differential between those discreet air cushions associated respectively with the dipping and lifting edges of the pallet to impart a greater righting movement to the pallet 12 and load as it is being manoeuvred.

It will be apparent that the construction of pallets 12 according to the invention is not restricted to the size or shape shown and sets of pallets of different sizes and shapes for particular applications may be constructed within the scope of the invention.

We claim as our invention:

A pallet for lifting, supporting and transporting loads, comprising: a platform-like member, a plurality of hollow inflatable members of flexible material horizontally disposed under said platform-like member, duct means for supplying pressurized fluid to each of said hollow inflatable members whereby said members can be inflated to raise and initially support said platform-like member, each of said hollow inflatable members forming at least a portion of the peripheral wall of horizontally extending open inner spaces under said platform-like member, passage means in the walls of said hollow inflatable members for passing pressurized fluid to said open inner spaces to form pressurized supporting cushions, said hollow inflatable members being each in substantially the form of a torus, said passage means being located in the inner wall of each torus, flexible skirts depending downwardly around the periphery of each of said hollow inflatable members for extending the depth of said pressurized supporting cushions, and a further flexible skirt depending downwardly from the platform-like member around the periphery thereof and surrounding said plurality of hollow inflatable members.

References Cited by the Examiner

UNITED STATES PATENTS

| | | | |
|---|---|---|---|
| 2,918,183 | 12/1959 | Petersen et al. | 180—7 |
| 2,922,277 | 1/1960 | Bertin | 180—7 |
| 2,938,590 | 5/1960 | Barnett | 180—7 |
| 3,029,045 | 4/1962 | Bertin et al. | 180—7 |
| 3,052,483 | 9/1962 | Petersen | 180—7 |
| 3,055,446 | 9/1962 | Vaughen | 180—7 |
| 3,081,886 | 3/1963 | Flexman et al. | 180—7 |
| 3,082,836 | 3/1963 | Billman | 180—7 |
| 3,097,718 | 7/1963 | Jay et al. | 180—7 |
| 3,119,598 | 1/1964 | Petersen et al. | 180—7 |
| 3,161,247 | 12/1964 | Mackie | 180—7 |

FOREIGN PATENTS

| | | |
|---|---|---|
| 219,133 | 1/1959 | Australia. |
| 246,358 | 9/1960 | Australia. |

BENJAMIN HERSH, *Primary Examiner.*

PHILIP ARNOLD, *Examiner.*